United States Patent [19]

Farr

[11] E Re. 28,881

[45] Reissued June 29, 1976

[54] BRAKE ADJUSTERS

[75] Inventor: Glyn P. R. Farr, Warwick, England

[73] Assignee: Girling Limited, Birmingham, England

[22] Filed: Jan. 10, 1974

[21] Appl. No.: 432,359

Related U.S. Patent Documents

Reissue of:

[64] Patent No.: 3,442,357
Issued: May 6, 1969
Appl. No.: 618,914
Filed: Feb. 27, 1967

[30] Foreign Application Priority Data

Mar. 18, 1966 United Kingdom ..... 11915/66
May 7, 1966 United Kingdom ..... 20309/66

[52] U.S. Cl. ..... 188/196 D
[51] Int. Cl.[2] ..... F16D 65/56
[58] Field of Search ..... 188/71.8, 71.9, 106 F, 188/196 D

[56] References Cited

UNITED STATES PATENTS

| | | | |
|---|---|---|---|
| 2,949,173 | 8/1960 | Peras | 188/196 P |
| 2,973,841 | 3/1961 | McClure et al. | 188/196 D |
| 3,068,964 | 12/1962 | Williams et al. | 188/196 D X |
| 3,244,260 | 4/1966 | Frayer | 188/196 D |

FOREIGN PATENTS OR APPLICATIONS

| | | | |
|---|---|---|---|
| 916,516 | 1/1963 | United Kingdom | 188/196 D |

*Primary Examiner*—Duane A. Reger
*Attorney, Agent, or Firm*—Scrivener Parker Scrivener and Clarke

[57] ABSTRACT

An automatic adjuster comprises a mechanism of adjustable length operative between a hydraulic brake piston and either a cylinder or an opposed piston. A cam journalled in the cylinder or the opposed piston serves to apply the brake mechanically (hand brake) and act as a stop for the mechanism. The adjustable length mechanism comprises two members, one of which may be the first mentioned piston in interengagement with one another through a non-reversible screw-thread connection. A reversible screw-thread connection or a reversible face cam is provided for turning one member of the mechanism relatively to the other responsively to excessive piston travel to effect adjustment.

30 Claims, 11 Drawing Figures

BRAKE ADJUSTERS

Matter enclosed in heavy brackets [ ] appears in the original patent but forms no part of this reissue specification; matter printed in italics indicates the additions made by reissue.

British patent specification No. 971,799 describes an automatic adjuster wherein a reversible screw-thread connection is provided between two members of a mechanism of adjustable length. This mechanism is fitted between opposed members (piston and cylinder) of a hydraulic actuator. Relative rotation between these two members in one direction is effected responsively to excessive travel of the piston in the cylinder to effect the desired adjustment. Relative rotation in the opposite direction is prevented by a one way clutch whereby the adjustment is maintained.

When the brake is applied mechanically (hand brake), the braking force is transmitted through the mechanism of adjustable length. This adjuster therefore suffers the disadvantage that the reversible screw-thread connection and the one way clutch must be dimensioned to withstand the full braking force.

It is an object of the invention to provide an adjuster which avoids this and other disadvantages.

It is another object of the invention to provide an adjuster in which a non-reversible screw-thread connection is provided between the two members of the mechanism of adjustable length.

It is a further object of the invention to provide an automatic adjuster with a reversible screw-thread connection or a reversible face cam for causing relative rotation at a non-reversible screw-thread connection between two members forming a mechanism of adjustable length, to effect adjustment when excessive brake travel occurs.

A reversible screw-thread connection between two members is a connection such that axial displacement of one member causes rotation of the other member and vice versa whereas a non-reversible screw-thread connection between two members is one in which an axial force applied to one member cannot normally cause relative rotation between the members. Whether a screw-thread connection is reversible or not depends upon the pitch and flank angles of the thread and the coefficient of friction between the members.

A reversible screw-thread connection is one form of axial and rotational interengagement between two members through helically inclined surfaces. The reversible screw-thread connection is therefore equivalent in operation to a reversible face cam, i.e. a cam capable of converting an axial displacement into a rotational displacement and vice versa. A reversible face cam has certain advantages over a reversible screw-thread connection. For example a face cam is easier to manufacture under mass production conditions.

The present invention is useful in a hydraulic brake system wherein one of said brake members is a hydraulic piston and the other is associated with a cylinder in which the piston is slidable or with a counter-piston.

The invention is further described, by way of example, with reference to the accompanying drawings in which.

Figure 1:
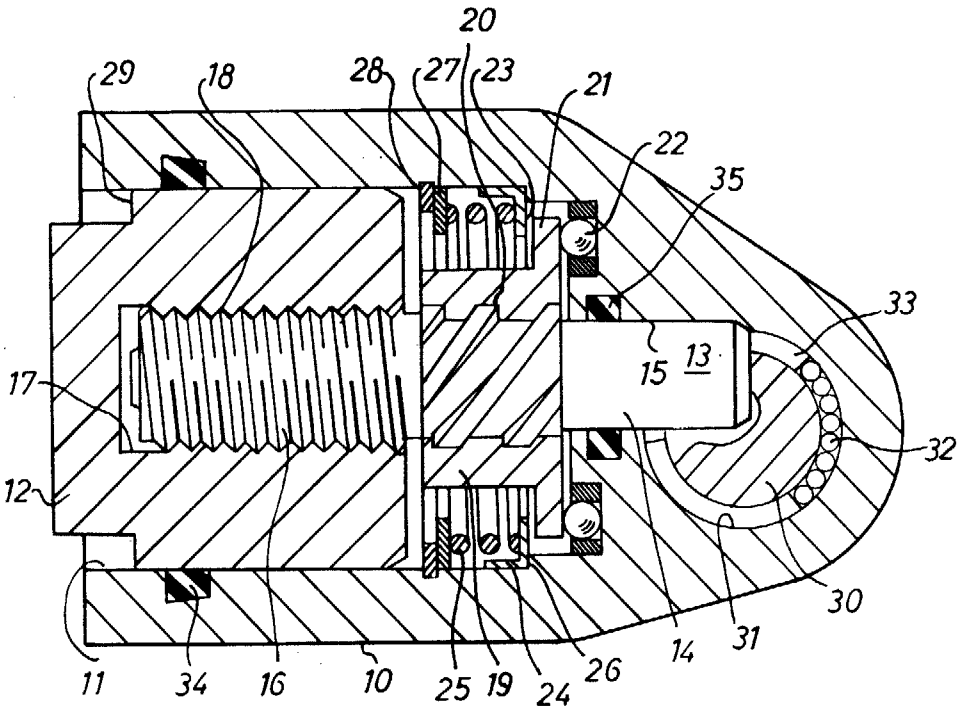
FIGS. 1, 2 and 3 are diagrammatic sectional elevations of three embodiments of automatic brake adjusters constructed in accordance with the present invention as applied to a hydraulic brake cylinder.

Referring now to FIG. 1, a brake cylinder body 10 of a hydraulic brake system for a vehicle has a cylinder bore 11 in which a brake actuating piston 12 is slidable. One end 13 of a rotatable spindle 14 is slidably received in a reduced diameter bore 15 co-axial with the cylinder bore 11. The other end 16 of the spindle 14 is received in a blind bore 17 in the face of the piston 12 and has a screw-thread connection 18 therewith. The screw-thread connection 18 is a right-hand non-reversible screw-thread connection.

A rotatable nut 19 has a screw-thread connection 20 with the center portion of the spindle 14. The screw-thread connection 20 is a *three-start* reversible left-hand screw-thread connection. The nut 19 has a collar 21 disposed between a rearward ball bearing abutment 22 and a forward flange abutment 23. The flange abutment 23 is provided by an L-section ring 24 urged by a spring 25 against a shoulder 26 at the inner end of the cylinder bore 11. The spring 25 is retained by a washer 27 which in turn is secured by a spring ring 28 received in a suitable groove in the wall of the bore 11.

The piston 12 acts against a brake pad or shoe (not shown) and the brake is applied by applying fluid pressure (e.g. by means of a pedal) to the inner end of the cylinder bore 11 through an inlet (not shown). A brake return spring (not shown) acts against an outer shoulder 29 on the piston 12.

An auxiliary brake-applying mechanism (e.g. for a hand brake) comprises a cam 30 rotatably received in a transverse bore 31 in the cylinder body 10 by roller bearings 32. The cam 30 is abutted by the rear end 13 of the spindle 14. When the cam 30 is turned anti-clockwise (in the drawing) the spindle 14 is moved to the left thereby moving the piston 12 to the left and applying the brake. The rollers 32 extend only over a small arc but are arranged to take the counter-thrust which arises when the cam 30 is turned to apply the brake. A cage 33 retains the rollers 32 in position.

A rubber seal 34 seals the piston 12 to the bore 11 and a rubber seal 35 seals the spindle end 13 to the bore 15.

The brake cylinder is shown in FIG. 1 in its normal resting position in which the brake return spring acting through the screw-head connection 18 on the spindle 14 urges the spindle end 13 against the cam 30 which thereby acts as a stop. The collar 21 touches the ball bearing abutment 22. During normal application of the brakes by hydraulic pressure the piston 12 is moved insufficiently to the left for the collar 21 to reach the abutment 23. However when the brake pad or shoe becomes worn, the piston 12 has additional travel before the brake can be properly applied and when the wear becomes excessive the collar 21 comes into frictional engagement with the abutment 23 which can apply a frictional torque to the nut 19 in excess of the frictional torque at the screw-thread connection 18 and at the sealing ring 35. Thus the axial thrust which arises at the reversible screw-thread connection 20 when the collar 21 is pressed against the abutment 23 causes the spindle 14 to be rotated. Such rotation unscrews the screw-thread connection 18 a little, friction at the interface between the piston 12 and the pad backplate (not shown) preventing the piston 12 rotating in the cylinder body 10.

When the brake pressure is released, the collar 21 reaches the ball bearing abutment 22 before the spindle end 13 returns to the cam 30 since the spindle 14 has screwed to the left somewhat in the nut 19. Since the ball bearing abutment 22 provides a low rotational frictional engagement with the collar 21 on the nut 19 less than the rotational friction at the screw-thread connection 18 and the sealing ring 35, the nut 19 turns freely about the spindle 14 until the spindle end 13 abuts the cam 30. Since the spindle 14 has been screwed slightly out of the piston 12 the piston 12 adopts a new normal resting position slightly further spaced from the spindle end 13 than before and slightly less pedal travel will be required the next time the brake is applied.

When the brake is applied by the footbrake the hydraulic pressure inside the cylinder bore 11 acts over the cross-sectional area of the reduced diameter bore 15 to produce a force acting to the right on the spindle 14. This loads the screw-thread connection 18 and the rotational friction at the screw-thread connection 18 is therefore increased in proportion to the applied brake pressure. At a predetermined brake pressure the frictional torque at the screw-thread connection 18 and the sealing ring 35 exceeds the frictional torque which can be produced between the collar 21 and the abutment 23. This maximum frictional torque is determined by the maximum axial force which can be set up between the collar 21 and the abutment 23 and this axial force is limited by the compressional force of the spring 25. Any attempts fo further increase the axial force results in further compression of the spring 25 and the spindle 14 no longer turns. Thus the adjuster of FIG. 1 is load conscious in that it only adjusts while the applied brake pressures are low. Thus a feature of the adjuster shown in FIG. 1 is while that it can be made to operate substantially only when the piston 12 is being moved to apply the brake. Heavy application of the brake resulting in a high fluid pressure in the cylinder bore 11 and further displacement of the piston 12 due to compression of the brake pad or shoe and deflection of other parts of the brake does not cause over-adjustment by the adjuster. The hydraulic pressure at which adjustment ceases is determined by the compression of the spring 25.

It is an advantage of the adjuster shown in FIG. 1 that when the hand brake is applied, so turning the cam 30, the brake-applying force is applied to the piston 12 only through the spindle 14 and the non-reversible screw-thread connection 18. Thus the reversible screw-thread connection 20 is not loaded by application of the hand brake and moreover, with the screw-thread connection 18 being non-reversible, the application of the hand brake does not produce counter-adjustment.

A disadvantage of the adjuster shown in FIG. 1 is that the sealing ring 35 provides unwanted frictional torque resisting rotation of the spindle 14 and making it necessary to provide a stronger spring 25 than would otherwise be required. This advantage is overcome in the embodiment of FIG. 2.

Figure 2:
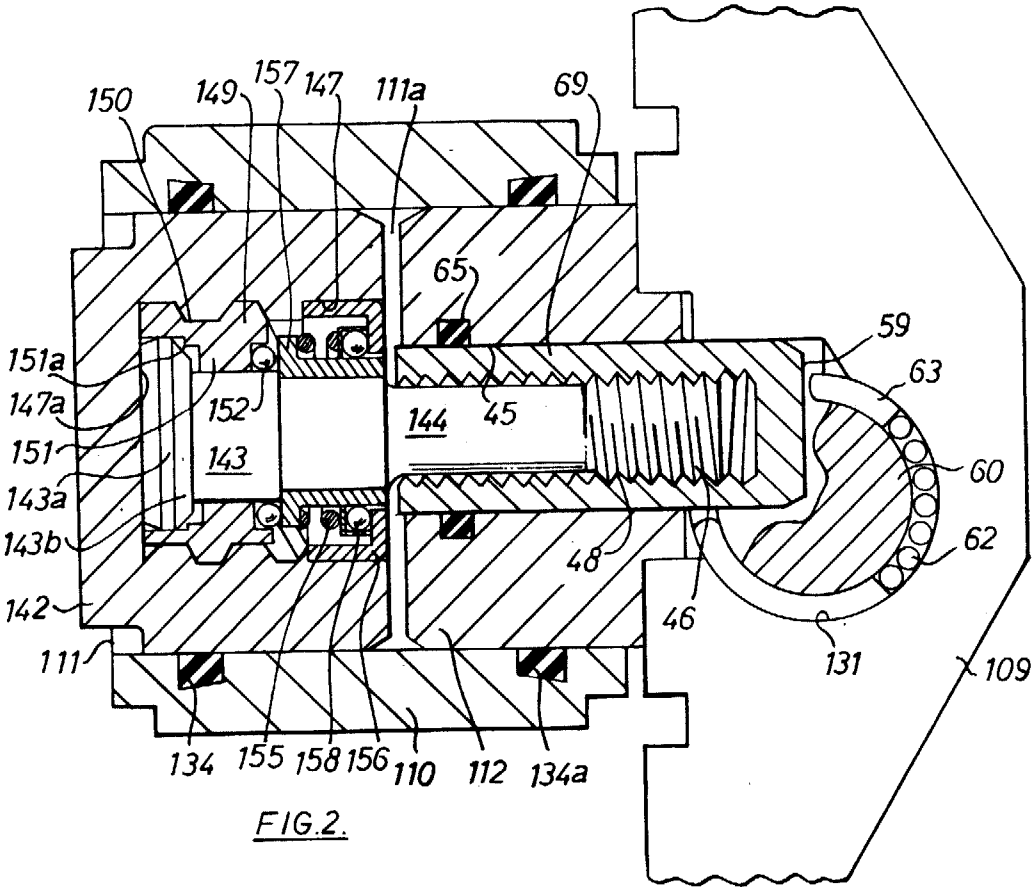

In FIG. 2 a cylinder body 110 has a through bore 111 in which opposed pistons 142 and 112 are slidable. The pistons 142 and 112 act on a directly operated pad and through a yoke 109 (only a fragment of which is shown in FIG. 2) on an indirectly operated pad as shown generally in FIG. 7 (still to be described). No brake return spring is provided. Rubber sealing rings 134 and 134a seal the pistons 142 and 112 to the bore 111. The bore 45 in which the cap 69, is slidable is formed in the piston 112 and means (not shown) are provided for preventing rotation of the piston 112 relative to the cap 69. The cap 69 has a right hand non-reversible screw-thread connection 48 with the outer end 46 of a spindle 144.

A rotatable cam 60 for the hand brake is journalled in a transverse bore 131 in the yoke 109 by roller bearings 62 for abutment by the rear end 59 of the cap 69. A cage 63 retains the rollers 62 in position.

A hollow screw 149 is located in a bore 147 of the piston 142 for the directly operated brake pad. This hollow screw 149 has a left-hand reversible screw-thread connection 150 with the piston 142 and has an internal flange 151 capable of limited axial displacement on the inner end 143 of the spindle 144. Such axial displacement is limited in one direction by a ball thrust bearing 152 retained in place by a flanged collar 157 shrink-fitted on to the spindle 144. The displacement is limited in the other direction by abutment of an annular edge 151a on the flange 151 against a conical surface 143b of a head flange 143a at the extreme end of the spindle 144. A spring 155 urges the head flange 143a against the base 147a of the bore 147. This spring acts between the flanged collar 157 and a ball thrust bearing 158 retained in position by an L-shaped ring force-fitted in the open end of the bore 147.

To apply the brake hydraulically, hydraulic pressure is applied to the space 111a between the opposed pistons 142 and 112 through an inlet (not shown). The piston 142 is urged to the left to actuate the directly operated pad and the piston 112 is urged to the right to actuate the yoke 109 and thereby indirectly operated pad. Initially the spindle 144 and the cap 69 move to the left with the piston 142 but as soon as the hydraulic pressure acting on the cap 69 is sufficient to overcome the spring 155, the head flange 143a is parted from the base 147a of the bore 147 and the end face 59 of the cap 69 is urged against the cam 60, acting as a stop. During normal operation of the brake the conical surface 143b does not reach the edge 151a. However, if there should be excessive piston travel due to brake wear, the conical surface 143b frictionally engages the edge 151a so that there is a frictional torque between the hollow screw 149 and the spindle 144. Further axial displacement of the piston 142 relative to the piston 112 and the yoke 109 causes the hollow screw 149 and with it the spindle 144 to be turned by the reversible screw-thread connection 150 so slightly unscrewing the screw-thread connection 48 between the spindle 144 and the cap 69 and adjusting the brake as described with reference to the previous embodiment.

Application of the hand brake turns the cam 60 in an anticlockwise direction to apply the directly operated pad through the connection 69, the non-reversible screw-thread connection 48, the spindle 144 and the piston 142. The indirectly operated pad is applied by the counterthrust acting on the yoke 109 through the roller bearings 62. Thus it is seen that application of the hand brake does not cause any load to be applied to the reversible screw-thread connection 150.

The nut 19 of FIG. 1 is conveniently made of a synthetic plastics material, such as nylon, which has a low coefficient of friction with metal and is light weight and cheap to manufacture. However, it is preferred to make the hollow screw 149 of FIG. 2 from metal, such as brass, so that the edge 151a will not be unduly distorted. In its normal resting position illustrated in FIG. 2 the hollow screw 149 abuts the base 147a of the bore 147 and this prevents the hollow screw from overscrewing under its own inertia when the brake is released after an adjustment has taken place.

In the embodiments of FIGS. 1 and 2 the reversible and non-reversible screw-thread connections are of opposite hand and any necessary adjustment takes place during application of the brake. However, an automatic adjuster is possible in which the reversible and non-reversible screw-thread connections are of the same hand but in this case any necessary adjustment takes place upon release of the brake. If there has been brake wear resulting in brake travel in excess of a predetermined travel free wheeling takes place at the reversible screw-thread connection. When the brake pressure is released the reversible screw-thread connection comes into operation and somewhat unscrews a spindle out of a cap (like the spindle 144 and the cap 69 of FIG. 2) and so provides adjustment to compensate for brake wear.

In the above-described embodiments there is a lost motion connection. In FIG. 1 it is between the nut 19 and the cylinder body 10 whereas in FIG. 2 it is between the nut 149 and the spindle 143. In one extremity of the lost motion there is a high frictional torque between the respective members and at the other extremity of the lost motion there is a comparatively low frictional torque between these members. In the embodiments of FIGS. 1 and 2 the low frictional torque is obtained by the use of a ball thrust bearing.

The actual amount of lost motion between the respective members having the lost motion connection therebetween can be so small as to be almost negligible. The lost motion has only to be sufficient to obtain the desired high and low frictional torque. The predetermined relative travel which may take place before adjustment is required can be achieved in this case by providing additional clearance at one or other or both of the screw-thread connections.

Referring now to FIGS. 3 to 6, a brake cylinder body 510 of a hydraulic brake system for a vehicle has a cylinder bore 511 in which opposed brake actuating pistons 508 and 509 are slidable. One end 513 of a rotatable spindle 514 has a screw-thread connection 518 with a nut 512 which is accommodated in a blind bore 523 in the piston 508 and co-axial with the cylinder bore 511. There is a certain amount of axial play or lost motion in the screw-thread connection 518, such play being equal to the desired normal relative piston travel before adjustment takes place. The screw-thread connection 518 is a right-hand non-reversible screw-thread connection. The piston 508 and the spindle 514 are prevented from turning relative to the cylinder body 510 by means still to be described.

A collar 516 is rotatably and axially displaceably journalled about the nut 512 adjacent a fixed collar 517 also disposed about the nut. A reversible face cam 519 is provided between the collars 516 and 517 and comprises three ball bearings 520 (FIGS. 5 and 6) engaging respective opposed cam surfaces 521 and 522 on the collars 516 and 517 respectively. The cam surfaces 521 and 522 are helically inclined, the helices being left-hand helices. The collars 516 and 517 are also accommodated in the blind bore 523 in the piston 508 and are retained therein by an insert 524 wedged in the open end of this bore. A torsion spring 536 acts between the collars 516 and 517, tending to turn the collars to urge the cam surfaces 521 and 522 against the ball bearings 520 which in turn tends to urge the collars axially apart. The collar 517 has a spherical seating surface which bears against a complementary surface 526 on the insert 524. The collar 516 bears by a thrust bearing 529 against a flange 537 on the nut 512. The nut 512 has a conical seating surface 527 which is urged by the spring 536 against a complementary surface 528 at the inner end of the blind bore 523 in the piston 508. A roller type *stepless* one-way clutch 540 acts between the collar 516 and the nut 512.

Figure 7:
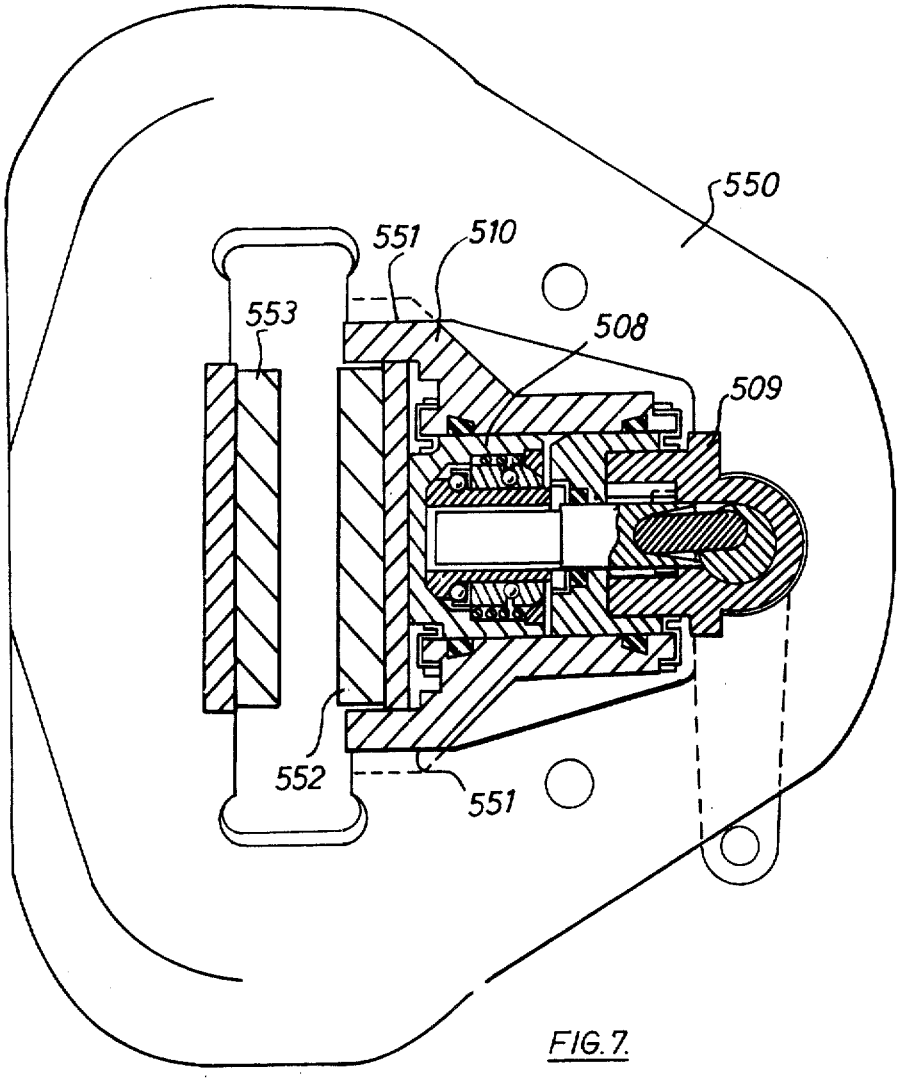
FIG. 7 is a sectional plan of a spot type disc brake embodying the actuation of FIGS. 3 to 6.

FIG. 7 of the drawings shows the brake actuator of FIGS. 3 to 6 fitted to a spot-type disc brake. The cylinder body 510 is fixed adjacent the disc (not shown) of the brake. The disc is straddled by a yoke 550 which is slidable in grooves 551 in the exterior of the cylinder body 510. The front end of the piston 508 abuts a directly operated pad 552. The pad so engages the piston 508 that it prevents the piston 508 from turning and the pad 552 is itself prevented from turning by the yoke 550. The piston 509 on the other hand abuts the yoke 550 so as to urge an indirectly operated pad 553 towards the pad 552 and is prevented from turning by the yoke. The brake is applied hydraulically by supplying brake fluid under pressure (e.g. from a master cylinder) through in inlet (not shown) in the cylinder body 10 to the space between the pistons 508 and 509.

An auxiliary brake-applying mechanism (e.g. for a hand brake) comprises a cam 530 rotatably received in a transverse bore 531 in the piston 509. The cam 530 is arranged to act on the outer end 533 of the spindle 514 through a dolly 532. When the cam 530 is turned, the spindle 514 is moved to the left thereby moving the piston 508 to the left relatively to the piston 509 and applying the brake.

The ends of a spring clip 556 on the spindle 514 engage a captive circular section key 557 received in a semicylindrical groove in the piston 509 (FIG. 4) to prevent the spindle 514 from turning. The piston 509 is in two parts 558 and 559 force-fitted together. The part 558 slides in the bore 511 whilst the part 559 bears against the yoke and journals the cam 530.

Rubber seals 534 seal the pistons 508 and 509 to the bore 511 and a rubber seal 35 seals the spindle 514 to a bore 515 in the part 558 of the piston 509.

Because of the clearance of the screw-thread connection 518, the dolly 532 may, in its normal resting position, be slightly spaced from the cam 530. This allows for "knock back" in the event of disc wobble. During application of the brakes by hydraulic pressure, the hydraulic pressure is transmitted through the clearance of the screw-thread connection 518 and acts on the left hand end of the spindle 514 to urge the spindle to the right. Movement of the spindle in this direction is limited by the dolly 532 abutting the cam 530, which thereby acts as a stop. The pistons 508 and 509 are moved apart but normally insufficiently for the play in the screw-thread connection 518 (usually about 0.020 nch) to be fully taken up. However when the brake pads become worn, the pistons 508 and 509 have additional relative travel before the brake can be fully applied and when the wear becomes excessive the thread clearance is taken up and the collar 516 is displaced towards the collar 517, thereby separating the surfaces 527 and 528 on the nut 512 and the piston 508 respectively. At the same time the face cam 519 causes the collar 516 to be turned clockwise (in FIG. 5) against the torsion in the spring 536. The frictional engagement at the surface 526 preventing the collar 517 from turning. The one way clutch 540 causes the collar 516 to turn the nut 512 and so unscrew the screw-thread connection 518 slightly. This increases the length of the strut comprising the spindle 514 and the nut 512 and slightly less pedal travel will be required the next time the brake is applied.

When the brake pressure is released, the spring 536, acting on the nut 512 through the collar 516 and the thrust bearing 529, returns the nut into abutment with the piston 508. The friction at the screw-thread connection 518 prevents the nut from screwing back and so nullifying the adjustment. However on such return movement of the spindle and nut, the spring 536 can turn the collar 516 anti-clockwise (in FIG. 5) since the one way clutch 540 permits such turning relative to the nut 512.

Figure 3:
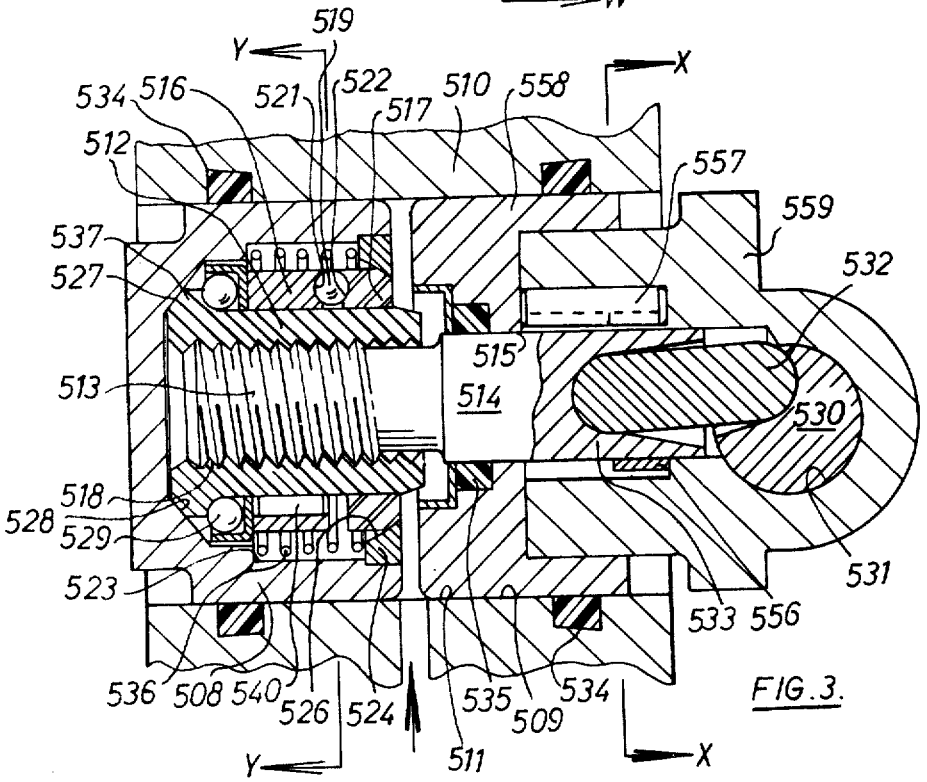
Figure 4:
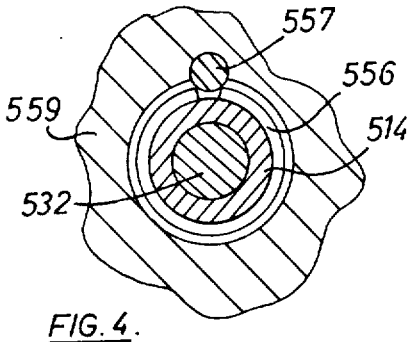
FIGS. 4 and 5 are sections respectively on the lines X—X and Y—Y of FIG. 3.
Figure 5:
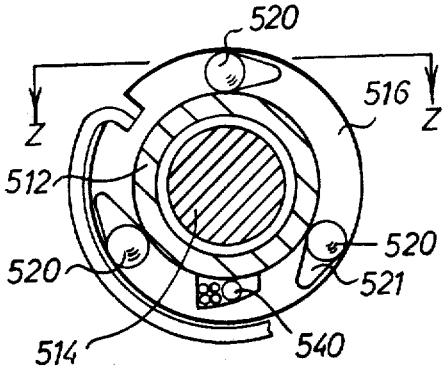
Figure 6:
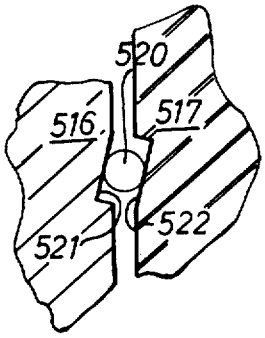
FIG. 6 is a section on the line Z—Z of FIG. 5.

It is an advantage of the adjuster shown in FIGS. 3 to 5 that when the hand brake is applied, so turning the cam 530, the brake-applying force is applied to the piston 512 only through the spindle 514 and the non-reversible screw-thread connection 518. Thus the face cam 519 and the one way clutch 540 are not loaded by application of the hand brake.

Figure 8:
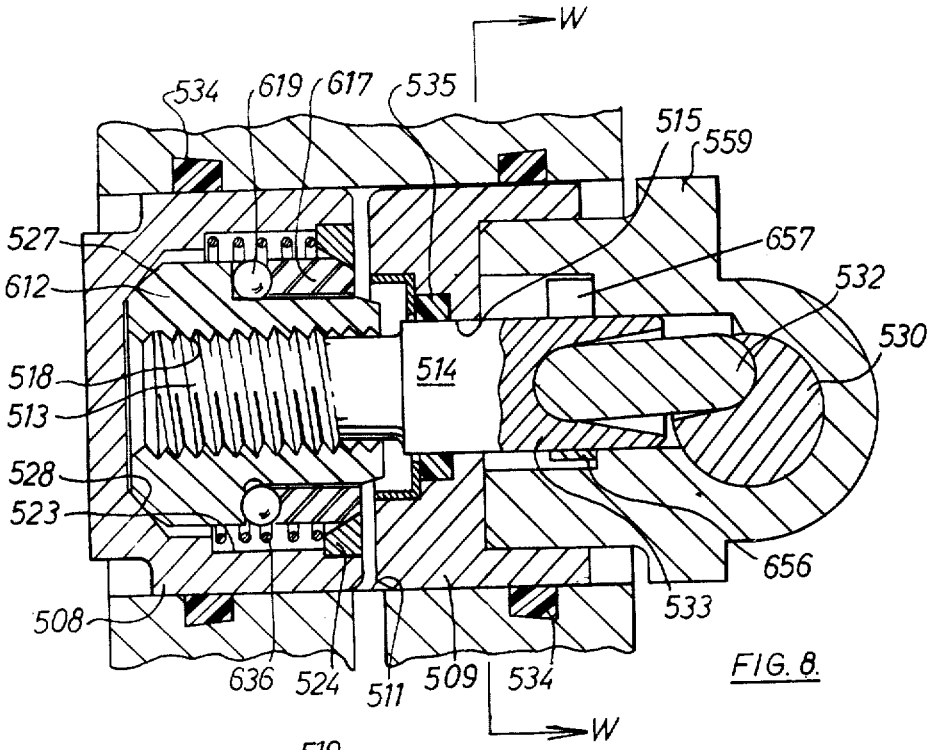
FIG. 8 is a sectional elevation of a fourth embodiment of automatic brake adjuster.

FIG. 8 of the drawings shows another embodiment of adjuster which is designed so that over adjustment does not take place in the event of deflection of the brake mechanism i.e. bending of the yoke, during very heavy application of the brakes. The adjuster of FIG. 8 in many respects has the same construction as the adjuster of FIG. 3 and like parts are denoted by like reference numerals. However in the embodiment of FIG. 8 a reversible face cam 619 is operative between a nut 612 accommodated within the blind bore 523 of the piston 508 and a collar 617. The collar 617 bears aginst the annular insert 524 force-fitted in the open end of the blind bore 523. A torsion spring 636 is operative between the nut 612 and the collar 617. The face cam 619 under the influence of the torsion spring 636 causes the spherical end surface 527 on the nut 612 to normally bear against a conical surface 528 at the inner end of the blind bore 523. The nut 612 has a non-reversible screw-thread connection 518 with the inner end 513 of the spindle 514.

Figure 9:
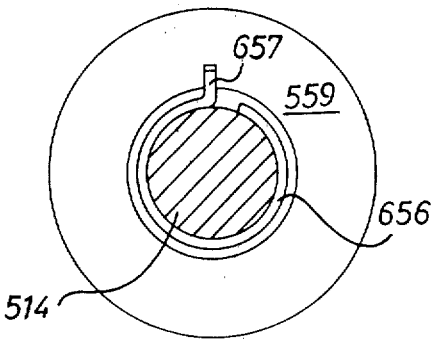
FIG. 9 is a section on the line W—W of FIG. 8.

As shown in FIG. 9 a projecting end 657 of a spring 656 fitted about the spindle 514 engages in a slot in the part 559 of the piston 509 to prevent the spindle rotating in an anticlockwise direction (FIG. 9) and thereby acts as a one way brake.

When the brake is applied by hydraulic pressure such pressure is transmitted through the clearance at the screw-thread connection 518 to the left hand end of the spindle 514. This urges the spindle 514 to the right to take up any clearance at the dolly 532 and the cam 530 thereby acts as an abutment for the spindle 514. The clearance at the screw-thread connection 518 is of such a size, about 0.010 inch, that it is not fully taken up during the normal relative piston travel upon application of the brake. However when there has been pad wear resulting in increased piston travel the thread clearance is fully taken up and the nut 612 is driven to the right relative to the piston 508 so separating the surface 527 and 528. The face cam 619 causes the nut 612 to be turned in a clockwise direction (FIG. 9) to stress the torsion spring 636. The frictional torque at the screw-thread connection 518 is greater than the frictional torque at the seal 535 and the one way brake spring 656 so that the spindle 514 is also turned clockwise. At the higher braking pressures the spindle 514 is urged against the dolly 532 by a correspondingly greater force and ultimately at very heavy braking pressures which might lead to brake deflection the frictional torque at the dolly 532 becomes significant and together with the frictional torques at the seal 535 and the brake spring 656 overcome the friction at the screw-thread connection 518. Thus any further relative travel between the pistons due to brake deflection at these very high pressures does not cause the spindle 514 to be turned. When the pressure is released the torsion spring 636 turns the nut 612 in an anticlockwise direction but the spindle 514 is prevented from turning by the brake spring 656. The nut 612 is thereby slightly unscrewed on the spindle 514 to effect the desired adjustment.

It will be seen that the adjustment is determined by the amount by which the spindle 514 is turned and the spindle 514 is not turned when the braking pressure is very high and brake deflection is likely to occur.

It will be seen that in contrast to other illustrated embodiments the adjustment at the screw-thread connection 518 actually takes place when the brake is released and it will also be seen that the screw-thread connection 518 is a right-hand screw-thread connection and that the face cam 619 has right-hand helical cam surfaces. The arrangement shown in FIG. 8 is therefore equivalent to the previously mentioned embodiment wherein reversible and non-reversible screw-thread connections of the same hand are employed.

Figure 11:
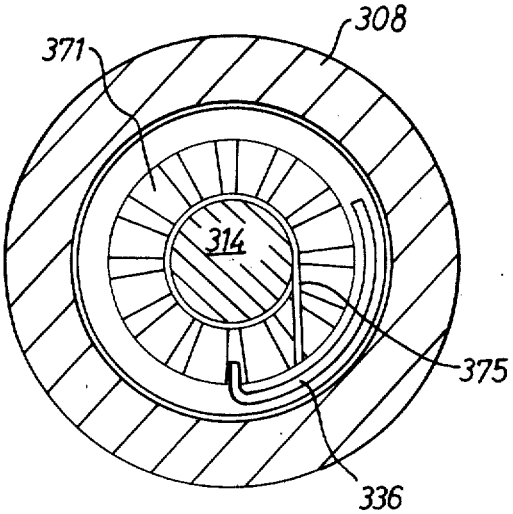
FIG. 11 is a section on the line B—B of FIG. 10.
Figure 10:
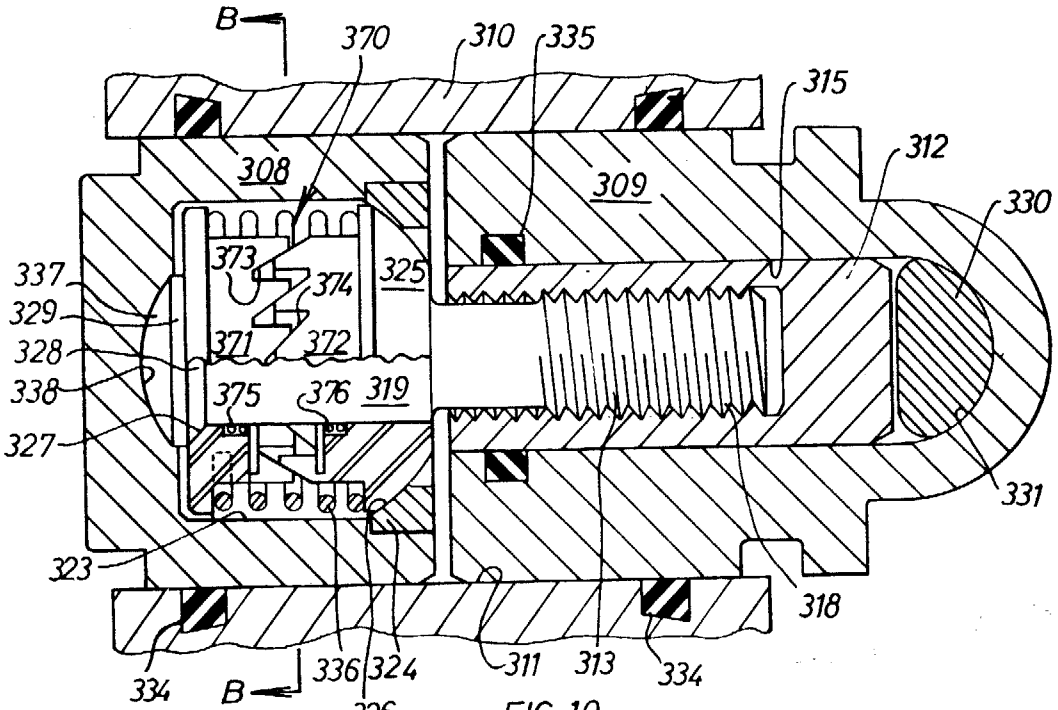
FIG. 10 is a sectional elevation of a fifth embodiment of automatic adjuster.

Referring now to FIGS. 10 and 11, a brake cylinder body 310 of a hydraulic brake system for a vehicle has a cylinder bore 311 in which opposed brake actuating pistons 308 and 309 are slidable. One end 313 of a rotatable spindle 314 has a screw-thread connection 318 with a cap 312 which is slidably received in a blind bore 315 in the piston 309 and co-axial with the cylinder bore 311. There is a certain amount of axial play or lost motion in the screw-thread connection 318, such play being equal to the desired normal relative piston travel before adjustment takes place. The screw-thread connection 318 is a right-hand non-reversible screw-thread connection. Friction at the interface between the piston 308 and the pad backplate (not shown) prevents the piston 308 from turning relative to the cylinder body 310 and the yoke (not shown) prevents the piston 309 from turning, the cap 312 being prevented from turning relative to the piston 309.

Collars 371 and 372 are rotatably and relatively axially displaceably journalled on the other end 319 of the spindle 314. A reversible face cam 370 is provided between the collars 371 and 372 and compress helically inclined abutting surfaces 373 and 374 on the collars 371 and 372 respectively, the helices being left-hand helices. The collars 371 and 372 are accommodated in a blind bore 323 in the piston 308 and are retained therein by an insert 324 wedged in the open end of this bore. The collar 372 has a spherical seating surface 325 which bears against a complementary surface 326 on the insert 324. The collar 371 has a conical seating surface 327 which bears against a complementary surface 328 at the rear of a head 329 on the end 319 of the spindle 314. A combined torsion and compression spring 336 acts between the collars 371 and 372, tending to urge the collars axially apart but at the same time tending to turn the collars to urge the cam surfaces 373 and 374 against one another. The head 329 has a spherical surface 337 normally in engagement with a complementary surface 338 at the base of the blind bore 323 in the piston 308. Spring type *stepless* one-way clutches 375 and 376 act respectively between the collars 371 and 372 and the spindle 314.

The brake is applied hydraulically by supplying brake fluid under pressure (e.g. from a master cylinder) through an inlet (not shown) in the cylinder body 310 to the space between the pistons 308 and 309.

An auxiliary brake-applying mechanism (e.g. for a hand brake) comprises a cam 330 rotatably received in a transverse bore 331 in the piston 309. The cam 330 is arranged to be abutted by the end of the cap 312. When the cam 330 is turned, the spindle 314 is moved to the left thereby moving the piston 308 to the left relatively to the piston 309 and applying the brake.

Rubber seals 334 seal the pistons 308 and 309 to the bore 311 and a rubber seal 355 seals the cap 312 to the bore 315.

The brake actuator is shown in FIG. 10 in its normal resting position in which the cap 312 may be slightly spaced from the cam 330. This allows the "knock back" in the event of disc wobble. During normal application of the brakes by hydraulic pressure, the cap 312 abuts the cam 330, which thereby acts as a stop, and the pistons 308 and 309 are moved apart but insufficiently for the play in the screw-thread connection 318 to be fully taken up. However when the brake pads become worn, the pistons 308 and 309 have additional relative travel before the brake can be fully applied and when the wear becomes excessive the collar 371 is displaced towards the collar 372, compressing the spring 336 and separating the surfaces 337 and 338 on the spindle head 329 and the piston 308 respectively. At the same time the face cam 370 causes the collar 371 to be turned clockwise (in FIG. 11), the frictional engagement between the surfaces 325 and 326 preventing the collar 372 from turning. The one way clutch 375 causes the collar 371 to turn the spindle 314 and so unscrew the screw-thread connection 318 slightly. This increases the length of the strut comprising the spindle 314 and the cap 312 and slightly less pedal travel will be required the next time the brake is applied. The one way clutch 376 permits the spindle 314 to rotate in the collar 372 during such adjustment.

When the brake pressure is released, the spring 336, acting on the spindle 314 through the collar 371 and the mating surfaces 327 and 328 returns the head 329 into abutment with the piston 308. The one way clutch 376 acting between the collar 372 and the spindle 314 prevents the spindle from screwing back and so nullifying the adjustment, the frictional interengagement between the surfaces 325 and 326 still preventing the collar 372 from turning. However on such return movement of the head, the spring 336 can turn the collar 371 anticlockwise (in FIG. 11) since the one way clutch 375 permits such turning relative to the spindle 314, the spring 336 being strong enough in torsion to overcome the friction at the surfaces 327 and 328.

It is an advantage of the adjuster shown in FIGS. 10 and 11 that the face cam 370 and the one way clutches 375 and 376 are not loaded by application of the handbrake.

I claim:

1. In a vehicle braking system having an automatic adjuster operative between two relatively movable elements actuable to apply a brake: a mechanism of adjustable length for limiting relative travel between said elements upon brake release and comprising first and second members and a [ nonreversible ] *non-reversible* screw-thread connection between said members; and means for effecting adjustment and comprising opposed relatively rotatable and axially displaceable means, helically inclined surface means thereon, said opposed means being coaxial with one another and with said non-reversible screw-thread connection and being in interengagement with one another through said helically inclined surface means whereby relative to and fro axial displacement between said opposed means responsive to an excess relative travel between said elements causes relative back and forth rotation between said opposed means, and means for effecting transmission of said relative rotation in one direction only to said first and second members, *said last mentioned means comprising axial abutment means to frictionally resist relative rotation between said one of said opposed means and one of said members during relative rotation in one direction between said opposed means and axial thrust bearing means acting in the opposite axial direction to said abutment means and freely permitting relative rotation between said one of said opposed means and said one member during relative rotation in the opposite direction between said opposed means.*

2. In a vehicle braking system having a hydraulic actuator, a cam and an automatic adjuster, said hydraulic actuator including a piston and reaction means opposed to said piston, said cam being rotatably journalled in said reaction means, said automatic adjuster being operative between said piston and said cam: a mechanism of adjustable length for limiting relative travel between said piston and said cam upon brake release and comprising first and second members and a nonreversible screw-thread connection between said members; means providing a fixed resting position for said cam which is rotatable therefrom to apply a brake-applying thrust through said mechanism of adjustable length to said piston; and means for effecting adjustment and comprising opposed relatively rotatable and axially displaceable means, helically inclined surface means thereon, said opposed means being in interengagement with one another through said helically inclined surface means whereby relative axial displacement between said opposed means responsive to an excess relative travel betweeen said piston and said cam causes relative rotation between said opposed means and means for transmitting said relative rotation in one direction only to said first and second members.

3. An adjuster according to claim 2 in which said reaction means comprises a cylinder body having a bore in which said piston is slidable.

4. An adjuster according to claim 2 in which said reaction means includes another piston opposed to the first-mentioned piston, said actuator also including a cylinder body having a through-bore, both said pistons being slidable in said through-bore.

5. In a vehicle braking system having a hydraulic actuator and an automatic adjuster operative between two relatively movable elements actuable to apply a brake: a mechanism of adjustable length for limiting relative travel between sad elements upon brake release and comprising a piston of said hydraulic actuator and a spindle having a non-reversible screw-thread connection with said piston; and means for effecting adjustment and comprising opposed relatively rotatable and axially displaceable means, helically inclined surface means thereon, said opposed means being in interengagement with one another through said helically inclined surface means, one of said opposed means comprising an annular member and the other of said opposed means comprising means [ of ] *on* said spindle, and an abutment and a thrust bearing on one of said elements, said annular member being axially movable between said abutment and said thrust bearing whereby excess relative travel between said elements causes relative rotation between said opposed means, said relative rotation being transmitted in one direction only to said piston and said spindle.

6. An adjuster according to claim 5 in which said abutment includes a yieldable spring means and in which said hydraulic actuator includes means opposed to said piston and having a bore therethrough, said spindle being sealingly slidable in said bore whereby said screw-thread connection is loaded by an axial force arising from the hydraulic pressure applied to the hydraulic actuator.

7. In a vehicle braking system having a hydraulic actuator and an automatic adjuster operative between two relatively movable elements actuable to apply a brake, one of said elements comprising a piston of said hydraulic actuator: a mechanism of adjustable length for limiting relative travel between said elements upon brake release and comprising a spindle and a cap having a non-reversible screw-thread connection with said spindle, said spindle having a head normally in abutment with said piston, said adjuster including means preventing rotation of said cap relative to said piston; and means for effecting adjustment and comprising opposed relatively rotatable and axially displaceable means, helically inclined surface means thereon, said opposed means being in interengagement with one another through said helically inclined surface means whereby relative axial displacement between said opposed means responsive to an excess relative travel between said elements causes relative rotation between said opposed means and means for transmitting said relative rotation in one direction only to said spindle and said cap.

8. An adjuster according to claim 7 in which one of said opposed means comprises an annular member having in abutment thereon, said head of said spindle being movable against said abutment, and the other of said opposed means is on said piston.

9. An adjuster according to claim 8 which further comprises one way clutch means operative between said spindle and said annular member.

10. An adjuster according to claim 9 which further comprises one way clutch means operative between said spindle and said piston.

11. In a vehicle braking system having a hydraulic actuator and an automatic adjuster operative between two relatively movable elements actuable to apply a brake, one of said elements comprising a piston of said hydraulic actuator which includes means opposed to said piston and having a bore therethrough: a mechanism of adjustable length for limiting relative travel between said elements upon brake release and comprising a spindle and a nut having a non-reversible screw-thread connection with said spindle, said nut being disposed for frictional engagement with said piston and said spindle being sealingly slidable in said bore of said hydraulic actuator whereby the spindle is subjected to the hydraulic pressure applied to the piston but in the opposite direction thereto; and means for effecting adjustment and comprising opposed relatively rotatable and axially displaceable means, helically inclined surface means thereon, said opposed means being in interengagement with one another through said helically inclined surface means whereby relative axial displacement between said opposed means responsive to an excess relative travel between said elements causes relative rotation between said opposed means and means for transmitting said relative rotation in one direction only to said spindle and said nut.

12. An adjuster according to claim 11 in which one of said opposed means comprises an annular member having a thrust bearing thereon, said nut being disposed to engage said annular member through said thrust bearing and the other of said opposed means comprises means on said piston, said adjuster including means preventing rotation of said spindle relative to said piston.

13. An adjuster according to claim 11 in which said opposed means respectively comprise means on said nut and means on said piston, and said adjuster includes means permitting rotation of said spindle in one direction only relative to said piston and preventing relative rotation therebetween in an opposite direction.

14. An adjuster as claimed in claim 1 in which [ said opposed means and ] said helically inclined surface means [ thereon comprises ] *on said opposed means comprise* a reversible screw-thread connection.

15. In a vehicle braking system having an automatic adjuster operative between two relatively movable elements actuable to apply a brake: a mechanism of adjustable length for limiting relative travel between said elements upon brake release and comprising first and second members and a non-reversible screw-thread connection between said members; and means for effecting adjustment and comprising a reversible face cam which comprises opposed relatively rotatable and axially displaceable means with mutually co-operating, helically inclined surface means thereon, whereby relative to and fro axial displacement between said opposed means responsive to an excess relative travel between said elements causes relative back and forth rotation between said opposed means, said adjustment effecting means further comprising means for transmitting said relative rotation in one direction only to said first and second members.

16. An adjuster as claimed in claim 15 in which said helically inclined surface means comprise opposed helical surfaces on said opposed means and said reversible face cam includes balls fitted between said opposed helical surfaces.

17. An adjuster according to claim 15 which further comprises a torsion spring operative between said opposed means of said reversible face cam.

18. A disc brake comprising, in combination with an automatic adjuster according to claim 1; a body member and a pair of opposed brake pads adapted to engage opposite faces of a brake disc, said relatively movable elements between which said adjuster is operative being located in said body member and positioned to cooperate with respective ones of said pads.

19. A disc brake comprising, in combination with an adjuster according to claim 4; a yoke slidably mounted on said cylinder body or sliding movement longitudinally thereof and engaged by one of said pistons and a pair of opposed brake pads, one pad being engaged by the other of said pistons and the other pad being engaged by said yoke.

20. A vehicle brake comprising, in combination with an automatic adjuster according to claim 1; a pair of opposed brake pads and a hydraulic actuator comprising a body member having a cylinder bore therein and at least one piston slidable in said bore and constituting one of said relatively movable elements, the other of said elements also being located in said body member, said first and second members and said opposed means all being located within said cylinder bore of said body member, said relatively movable elements being positioned to co-operate with respective one of said pads.

[ 21. An adjuster according to claim 1 wherein said means for effecting transmission of relative rotation includes means resisting relative rotation between one of said opposed means and one of said elements during relative rotation in one direction between said opposed means and freely permitting relative rotation between said one of said opposed means and said one of said elements during relative rotation in the opposite direction between said opposed means. ]

[ 22. An adjuster according to claim 21 wherein the last-mentioned means comprises axial abutment means to frictionally resist relative rotation between said one of said opposed means and said one element and axial thrust bearing means acting in the opposite axial direction to said abutment means and freely permitting relative rotation between said one of said opposed means and said one element. ]

[ 23. An adjuster according to claim 21 wherein the last-mentioned means comprises a one way clutch.]

*24. An adjuster according to claim 14 in which said reversible screw-thread connection comprises a multi-start screw-thread connection.*

*25. An adjuster according to claim 1 in which said opposed means comprise face cam means and said helically inclined surface means comprise mutually cooperating helically inclined surfaces thereon.*

*26. In a vehicle braking system having an automatic adjuster operative between two relatively movable elements actuable to apply a brake: a mechanism of adjustable length for limiting relative travel between said elements upon brake release and comprising first and second members and a non-reversible screw-thread connection between said members; and means for effecting adjustment and comprising opposed relatively rotatable and axially displaceable means, helically inclined surface means thereon, said opposed means being coaxial with one another and with said non-reversible screw-thread connection and being in interengagement with one another through said helically inclined surface means whereby relative to and fro axial displacement between said opposed means responsive to an excess relative travel between said elements causes relative back and forth rotation between said opposed means, and means for effecting transmission of said relative rotation in one direction only to said first and second members, said last-mentioned means comprising a stepless one way clutch for resisting relative rotation between one of said opposed means and one of said members during relative rotation in one direction between said opposed means and permitting relative rotation between said one of said opposed means and said one of said members during relative rotation in the opposite direction between said opposed means.*

*27. An adjuster according to claim 1 in which said axial abutment means includes a conical friction surface.*

*28. An adjuster according to claim 1 further comprising frictional abutment surfaces between said second member and a second of said elements and spring means operative to urge said first and second members respectively to follow movement of the first and second elements to cause said to and fro axial displacement and operative to hold said frictional abutment surfaces in engagement with one another when the braking system is released, said second element being non-rotatable and said second member being normally rotatable.*

*29. In a vehicle braking system having an automatic adjuster operative between two relatively movable elements actuable to apply a brake: a mechanism of adjustable length for limiting relative travel between said elements upon brake release and comprising first and second members and a non-reversible screw-thread connection between said members; and means for effecting adjustment and comprising opposed relatively rotatable and axially displaceable means, helically inclined surface means on said opposed means, said opposed means being in interengagement with one another through said helically inclined surface means and said helically inclined surface means comprising a reversible screw-thread connection between said opposed means, said opposed means being coaxial with one another and with said reversible and non-reversible screw-thread connections, and means for applying to one of said opposed means a first frictional torque which is high relative to that at said reversible screw-thread connection in one direction of rotation and a second frictional torque which is low compared with the frictional torque at said reversible screw-thread connection in the opposite direction of rotation, whereby relative to and fro axial displacement between said opposed means responsive to an excess relative travel between said elements causes relative back and forth rotation between said opposed means but relative rotation in one direction only between said first and second members.*

*30. In a vehicle braking system having an automatic adjuster operative between two relatively movable elements actuable to apply a brake: a mechanism of adjustable length for limiting relative travel between said elements upon brake release and comprising first and second members and a non-reversible screw-thread connection between said members; and means for effecting adjustment and comprising opposed relatively rotatable and axially displaceable means, helically inclined surface means on said opposed means, said opposed means being in interengagement with one another through said helically inclined surface means and said helically inclined surface means comprising a reversible screw-thread connection between said opposed means, said opposed means being coaxial with one another and with said reversible and non-reversible screw-thread connections, axial clearance determining the desired brake travel being provided at at least one of said screw-thread connections, whereby relative to and fro axial displacement between said opposed means responsive to an excess relative travel between said elements causes relative back and forth rotation between said opposed means, and means for effect-*

*ıg transmission of said relative rotation in one direction nly to said first and second members.*

*31. In a vehicle braking system having an automatic djuster operative between first and second relatively ıovable elements actuable to apply a brake: a mechaism of adjustable length for limiting relative travel beween said elements upon brake release and comprising ɔindle and nut members having a non-reversible screwhread connection therebetween, said spindle and nut ıembers cooperating respectively with said first and econd elements; and means for effecting adjustment and ɔmprising opposed relatively rotatable and axially dislaceable means operative between said second element nd said nut member, helically inclined surface means on ıid opposed means, said opposed means being annular nd coaxial with one another and with said non-reversile screw-thread connection and being in interengageıent with one another through said helically inclined ırface means, whereby relative to and fro axial displaceıent between said opposed means responsive to an excess elative travel between said elements causes relative back nd forth rotation between said opposed means, and ıeans for effecting transmission of said relative rotation ı one direction only to said spindle and nut members.*

*32. An adjuster according to claim 29 in which said ɔindle member and said second element are both nonɔtatable.*

*33. In a vehicle braking system having a fluid operated actuator, an automatic adjuster operative between two relatively movable elements of the fluid operated actuator actuable to apply a brake and a mechanical actuator also actuable to apply said brake: a mechanism of adjustable length for limiting relative travel between said elements upon brake release and comprising first and second members and a non-reversible screw-thread connection between said members, said mechanical actuator being arranged in one of said elements and said first and second members being disposed to be engaged by said mechanical actuator and by the other of said elements, respectively; and means for effecting adjustment and comprising opposed relatively rotatable and axially displaceable means associated respectively with said second member and said other element, helically inclined surface means on said opposed means, said opposed means being coaxial with one another and with said non-reversible screw-thread connection and being in interengagement with one another through said helically inclined surface means, whereby relative to and fro axial displacement between said opposed means responsive to an excess relative travel between said elements upon operation of said fluid operated actuator causes relative back and forth rotation between said opposed means, and means for effecting transmission of said relative rotation in one direction only to said first and second members.*

* * * * *